United States Patent
Nagarajan et al.

(10) Patent No.: US 6,674,899 B2
(45) Date of Patent: Jan. 6, 2004

(54) AUTOMATIC BACKGROUND DETECTION OF SCANNED DOCUMENTS

(75) Inventors: Ramesh Nagarajan, Pittsford, NY (US); Xing Li, Webster, NY (US); Francis K. Tse, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 591 days.

(21) Appl. No.: 09/739,405

(22) Filed: Dec. 18, 2000

(65) Prior Publication Data

US 2002/0076102 A1 Jun. 20, 2002

(51) Int. Cl.[7] ................................................. G06K 9/00
(52) U.S. Cl. ....................... 382/168; 382/170; 382/171; 382/176; 358/462; 358/464
(58) Field of Search ................................. 382/175, 176, 382/180, 168, 169, 170, 171, 172, 164, 199, 112, 275, 254, 255, 272; 358/462, 464, 453, 466, 488, 449

(56) References Cited

U.S. PATENT DOCUMENTS

| | | | | |
|---|---|---|---|---|
| 5,086,485 A | | 2/1992 | Lin | 382/51 |
| 5,488,491 A | * | 1/1996 | Steinkirchner | 358/501 |
| 5,751,848 A | | 5/1998 | Farrell | 382/172 |
| 5,832,105 A | * | 11/1998 | Morimoto et al. | 382/151 |
| 5,835,628 A | | 11/1998 | Farrell | 382/168 |
| 5,848,183 A | | 12/1998 | Farrell | 382/172 |
| 5,881,166 A | | 3/1999 | Farrell | 382/168 |
| 6,198,845 B1 | * | 3/2001 | Tse et al. | 382/169 |

* cited by examiner

Primary Examiner—Bhavesh M. Mehta
Assistant Examiner—Ali Bayat
(74) Attorney, Agent, or Firm—William Eipert (57) ABSTRACT

A method for generating a background statistics that distinguishes between gray level information from document areas and non-document areas. The method includes determining a full page background statistics from selected pixels within a scanned area; determining a sub-region background statistics from selected pixels within a sub-region of the scanned area; determining if the sub-region background statistics corresponds to image data from a non-document area; determining if the full page background statistics is corrupted; and generating a validated full page background statistics if the full page background statistics is corrupted.

19 Claims, 6 Drawing Sheets

AUTOMATIC BACKGROUND DETECTION OF SCANNED DOCUMENTS

BACKGROUND OF THE INVENTION

The present invention relates generally to automatic background detection of a scanned document. More particularly, this invention relates to a process for identifying the background value of a scanned image that separates gray levels of non-document areas from those of the document.

In a conventional digital reproduction device, a document or image is scanned by a digital scanner which converts the light reflected from the document into electrical charges representing the light intensity from predetermined areas (pixels) of the document. The pixels of image data are processed by an image processing system which converts the pixels of image data into signals which can be utilized by the digital reproduction machine to recreate the scanned image. In other words, the image processing system provides the transfer function between the light reflected from the document to the mark on the recording medium.

One measure of the performance of a reproduction machine is how well the copy matches the original. Copy quality can be measured in a variety of different ways. One way is to look at the characteristics of the reproduced image. An example of such a characteristic for determining the quality of the reproduced image is the contrast of the image. The contrast of an imaged (copied) document is one of the most commonly used characteristics for measuring quality since contrast provides a good overall assessment of the image's quality. To assure high quality at the output printing device, it is desirable to know the contrast of the image being scanned prior to the image processing stage because, with this knowledge, the image processing system can process the image data so that the reproduced image has the proper contrast. Background detection processes provide one way of obtaining this contrast information prior to further digital image processing.

Conventional automatic background detection processes collect intensity information to create a histogram of the scanned image. The process then identifies a background peak from the histogram, estimates a curve including the peak and calculates the mean and standard deviation. The standard deviation is then used to determine the gain factor for the document. The gain factor is used to compensate for the background gray level of the image of the scanned document. In this manner, the gray level histogram provides an easy to read measure of the image contrast from which a background value can be easily generated. However, it should be noted that the background value is only as accurate as the histogram from which it is generated. Therefore, when generating a histogram to determine the background level of a scanned image, one must be certain to sample only those pixels which are from within the document area.

In conventional systems, background detection is performed by sampling pixel values either within a sub-region of the document (typically the leading edge) or across the whole document (page). These approaches typically rely on a predefined measure of scanned image size and shape which may not reflect the actual size and shape of the scanned document. Thus, while these approaches produce reasonable results when the predefined measure accurately reflects the size and shape of the scanned document, the approaches may fail to accurately measure the background if the scanned document is not the same size as the predefined measure or if the scanned document is positioned such that predefined measure includes background areas other than that of the document (e.g., platen cover).

For example, consider scanning a document from a platen with a white or light gray platen cover. When the document to be scanned is smaller than the predefined measure, the histogram generated would contain gray level values corresponding to the white platen cover in addition to the gray level values of the document. If enough of the platen cover is included in the histogram, the background value detected would be incorrect. Therefore, it is desirable to utilize a background detection process that can differentiate gray level information obtained from non-document areas from the gray level information corresponding to the document's background. When utilizing such a process, the background value will reflect the value of the document and not the gray level of non document areas, and thus, the output copy from the printing device will not realize a loss of image quality.

SUMMARY OF THE INVENTION

In accordance with one aspect of the present invention, there is provided a method for generating background statistics for a scanned document. The method includes the steps of (a) determining a full page background statistic from selected pixels within a document area; (b) determining a sub-region background statistic from selected pixels within a sub-region of the document area; (c) determining if the sub-region background statistic corresponds to image data from a non-document area; (d) determining if the full page background statistic is corrupted; and (e) generating a validated full page background statistic if the full page background statistic is corrupted.

Pursuant to another aspect of the present invention, there is provided a method of generating background statistics that distinguishes between gray level information from document and non-document areas. The method includes generating a full page background statistic from pixels within a document area; generating a first sub-region background statistic from pixels within a first sub-region of the document area; generating a second sub-region background statistic from pixels within a second sub-region of the document area; determining if the first sub-region background statistic corresponds to gray level data from a non-document area; making a first determination of whether the full page background statistic is corrupted and, if so, generating a validated full page background statistic; determining if the second sub-region background statistic corresponds to gray level data from a non-document area; and making a second determination of whether the full page background statistic is corrupted and, if so, generating a validated full page background statistic.

DETAILED DESCRIPTION OF THE INVENTION

The following will be a detailed description of the drawings illustrating the present invention. In this description, as well as in the drawings, like referenced numbers represent devices, circuits, or equivalent circuits which perform the same or equivalent functions. While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

In the following description, the terms fastscan direction and slowscan direction are utilized. Fastscan direction refers to the scanning of pixels along a scanline or raster. This is also commonly referred to as the electronic scan in that the scanning is a result of collecting image data from an array of photoelectric sensors. Slowscan direction, on the other hand, refers to the direction of the relative movement between the document and the scanning system. This is the mechanical movement that causes the scanning system to generate scanlines of image data.

As noted above, conventional background detection approaches may fail to accurately measure the background if document being scanned does not accurately reflect the size and/or position of the average or expected document. To resolve this problem, the present invention proposes an approach to distinguish gray level information obtained from non-document areas from the gray level information corresponding to the document's background. The approach of the present invention collects histogram information for predefined area defining the size and shape of a standard full page document (e.g., 8.5×11, A4, etc.) as well as one or more sub-regions within the predefined area such as the edges where the platen may be detected if the predefined area does not accurately represent the scanned document. After the entire page has been scanned, the approach analyzes the histograms for the sub-regions to determine if the peak value of the histogram lies within the gray level value of the platen cover. If so, the approach then compares the peak value of the full page histogram to determine if it is within a threshold range of the peak value from either sub-region. If the full page peak is within a threshold range of either sub-region peak, the approach looks beyond the first peak value of the full page area to find another peak.

Figure 1:
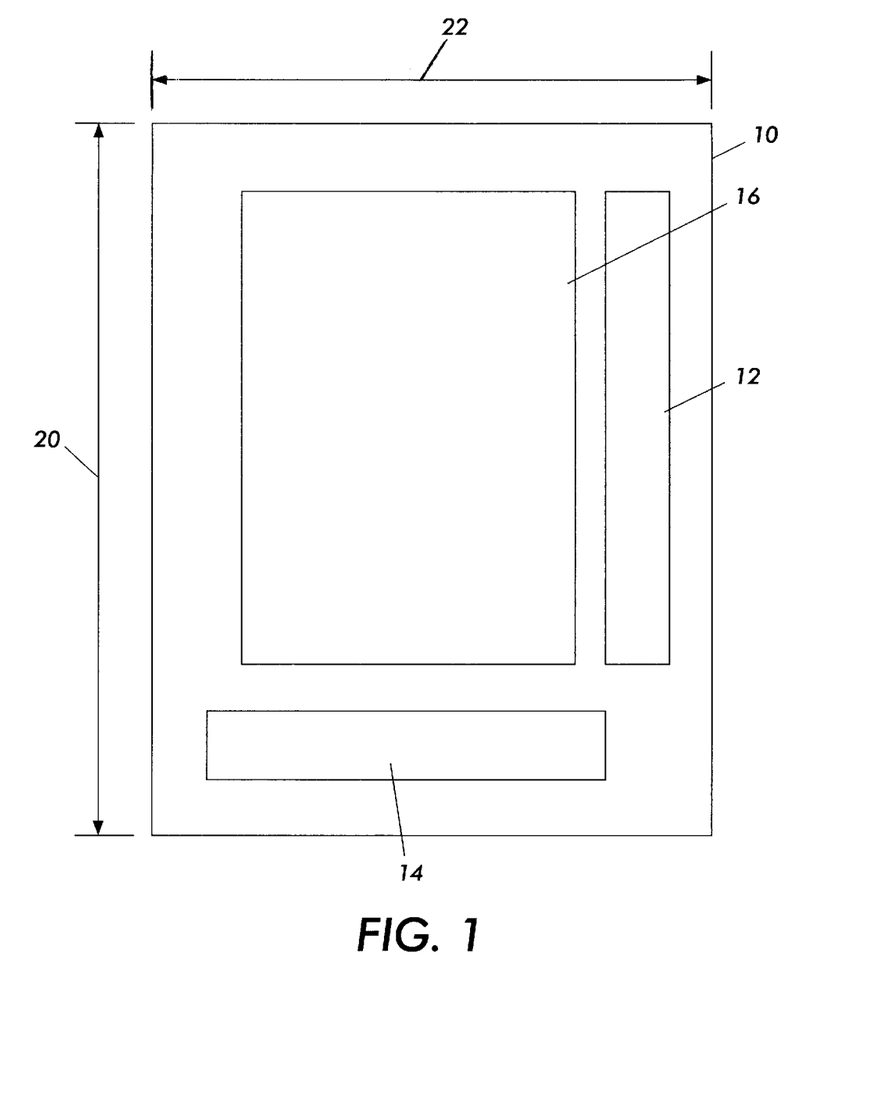
FIG. 1 illustrates the orientation of a scanned document area and sub-regions within the document area used in discussing the present invention.

Turning now to FIG. 1, there is shown a diagram illustrating the orientation of a scanned document and sub-regions within the scanned document used in discussing the present invention. In FIG. 1, area 10 represents the predefined area defining the size, shape and orientation of a standard full page document from which histogram data will be collected when scanning an input document. When scanning from the platen, the input document is usually placed at the top left corner (registration corner) of the platen. With this orientation, if the input document is smaller than the standard full page document (area 10), the platen cover will be exposed in bottom edge when the input document is smaller than the predefined area in the fastscan direction 20 or right edge when the input document is smaller than the predefined area in the slowscan direction 22. Thus, to distinguish gray level information corresponding to the platen cover from that of document areas, the approach collects histogram information from a sub-region, sample window 12, near the right edge and a sub-region, sample window 14, near the bottom edge in addition to the full page area 10. Furthermore, as will be explained in detail below, to assist in the detection of a second background peak, the approach collects histogram information from sub-region, sample window 16, at the document center.

It should be noted that the sample windows 12, 14 and 16 are shown for illustration purposes and are not limited to the regions shown in FIG. 1. That is, any one or more of the size, shape and position of the sample windows can be modified for a given application. For example, the right edge sample window 12 may extend down next to the bottom edge sample window 14. Additionally, sample window 12 and sample window 14 need not be mutually exclusive (i.e., the two regions may overlap). Furthermore, it should be appreciated the sample window 12 and 14 may be combined into and considered as a single sample window.

It should be appreciated that while the present invention is discussed with respect to a platen in which the upper left hand corner defines the registration corner, the invention can be easily adapted for scanning with other registration positions. For example, if the placement of an input document is registered at the center of the right edge, then the approach would beneficially collect histograms for sub-regions near one or more of the top, bottom, and left edges.

Figure 2:
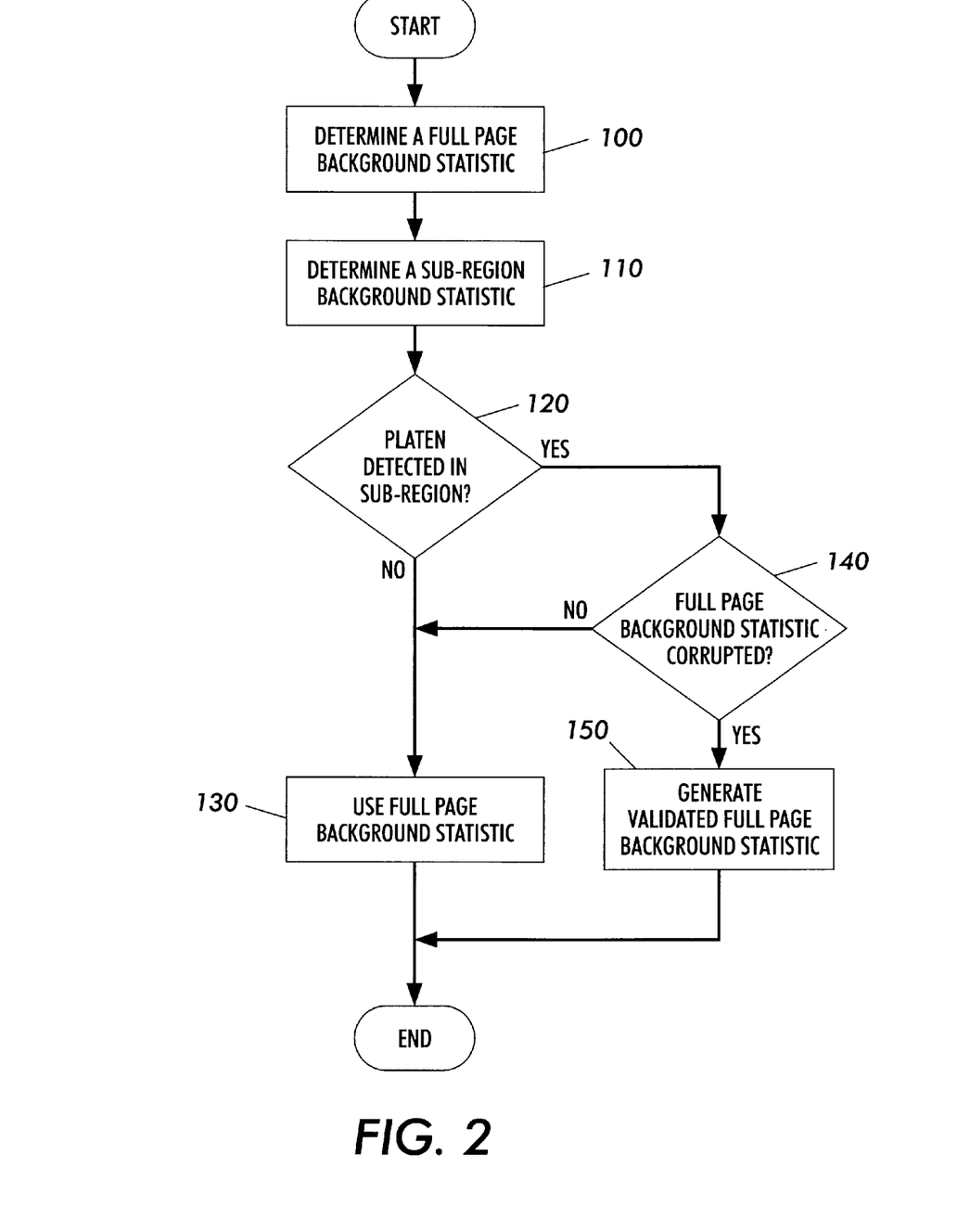
FIG. 2 is a flowchart showing a process to determine if gray level information from non-document areas is included in the determination of a document background value according to the concepts of the present invention.

Turning now to FIG. 2, there is shown a flowchart illustrating the steps in an embodiment of a scanning process in accordance with the present invention. Step 100 determines full page background statistics such as a histogram peak value, standard deviation, gain factor for the document, background gray level, etc. using the scanned image data for the predefined area 10 corresponding to a full page input document.

Step 110 determines background statistics using image data from a sub-region of document area 10, such as sample window 12 or 14, in which the platen cover or other non-document medium would be detected if the input document was not equivalent to the predefined document area 10. For purposes of illustration, the process will be described as operating on pixels within sample window 12. That is, step 110 generates background statistics such as a histogram peak value, standard deviation, gain factor for the document, background gray level, etc. using pixels in the video image data corresponding to sample window 12.

Step 120 determines if the platen cover is detected in the statistics generated for sample window 12. Specifically, step 120 compares the background statistics generated for window 12 to statistics for the platen cover. If the statistics from window 12 are not comparable to the platen cover statistics, the process establishes that the platen cover is not detected in window 12 and continues with step 130 wherein the full page statistics collected in step 100 are used for further background detection processing. If the background statistics from sample window 12 are comparable to those of platen cover, step 120 determines that platen cover is detected in window 12 and continues with step 140.

At step 140, the full page statistics from step 100 are compared to a corresponding statistics for the platen cover to determine if the full page statistics were corrupted by image data corresponding to the platen cover or other non-document area. If the full page statistics is within a threshold range of the platen cover statistics, the process judges the full page statistics to be corrupted and continues processing with step 150, otherwise the process judges the full page statistics to be valid and continues with step 130. At step 150, the process analyzes the full page statistics to generate validated full page statistics.

Figure 3:
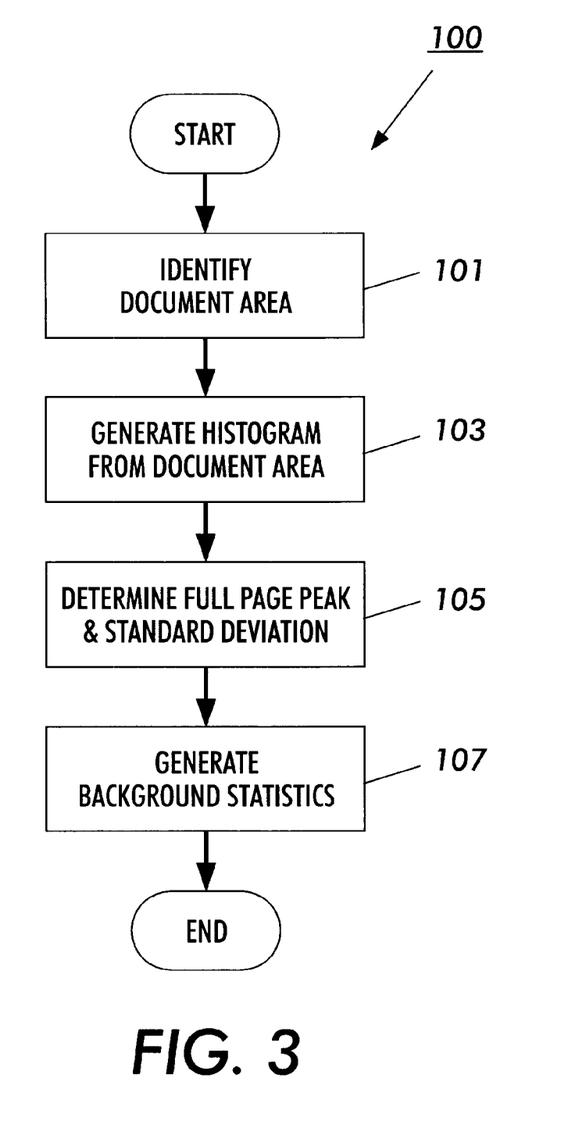
FIG. 3 illustrates a process for generating full page background statistics according to the concepts of the present invention.

FIG. 3. shows in more detail the process generating full page background statistics from the scanned image data carried out in step 100 of FIG. 2. In this process, step 101 sets up to generate a histogram from image values from within scanned area 10. More specifically, step 101 identifies the scanned area 10 from which the histogram data will be collected. Step 101 further identifies the subset of pixels within the area to be sampled if not all the pixels within the area will be used in generating the histogram. In step 103 histogram data is collected from selected pixels within the scanned image data from document area 10. Step 105 determines the full page background peak $P_f$ and the standard deviation $S_f$ from the histogram data collected at step 103. Step 107 can be included to generate additional statistics such as the gain factor from the peak $P_f$ and standard deviation $S_f$. As used herein, a peak $P_f$ or peak value $P_f$ identifies the bin value (gray level value) of the histogram bin containing the peak.

Briefly reviewing, a conventional approach for determining the background value of a document compiles a histogram of the image intensity values from selected pixels within the document area. Upon obtaining the histogram data, the background peak and white threshold are determined. The background peak value is the gray level with greatest number of pixels having an intensity related to the background (white) value of the image being scanned.

Once the histogram data is compiled, the bin values, each bin value is associated with a particular gray level value (the bin values range from 0 to 255 for an eight bit system), are read from the high intensity (white) bins to the low intensity (black) bins. The number of pixels at each bin (the frequency) is compared to a running stored maximum to find the first peak. Moreover, to prevent mis-identification of a minor peak as background, the frequency of the gray level bin and/or the gray level of the peak may be compared to a threshold. Furthermore, once a peak has been found in the histogram, the search of the histogram data may continue to look for an adjacent larger peak. If a larger peak is found without encountering a valley, the larger peak is designated as the background peak.

Having identified the background peak, the standard deviation from the mean or peak point in the histogram distribution is determined. In one method, the approximate shape of the histogram is estimated by defining a curve through at least three points including the frequency value in the bin with the highest occurrence frequency and the frequency values in the bins on each side of the bin having the highest occurrence frequency. The standard deviation of the distribution curve of the histogram can then be determined in a known manner. Alternatively, instead of fitting three or more sampled points into curve and approximating the result to a normal distribution, a weighted average of the sampled points can be used to determine the mean. Having the computed mean can and assuming a normal distribution, the standard deviation can be obtained in a conventional manner.

Alternatively, as a typical histogram distribution closely resembles a normal Gaussian distribution, the determination of the quarter (¼) peak value represents a reasonable estimate of the two sigma points from the mean (peak) in the histogram. In other words, the gray level having a frequency less than or equal to ¼ the peak frequency represents a point that is 2 standard deviations away from the mean or peak point in the histogram distribution. Alternatively, If the quarter (¼) peak frequency location cannot be determined, the gray level value which has a peak frequency equal to ⅝ of the peak frequency of the background peak can be used as identifying a gray level which is one standard deviation away from the mean or peak value of the histogram.

As histogram data tends to be noisy, smoothing of the data may be advantageous. One approach to smoothing the histogram adds the frequencies in N adjacent bins, divides the sum by N and places the result in a new bin. In this manner with N=4, a histogram with 256 bins is compressed into a histogram of 64 bins. Finally, once the standard deviation has been obtained, it is used to determine the gain factor from which the background gray level is determined.

A more complete discussion of generating and utilizing histogram data and determining background levels can be found in the following commonly owned US patents, which are incorporated by reference herein for their teachings: U.S. Pat. No. 5,086,485 entitled "Method and Apparatus for Dynamically Setting a Background Level" to Lin; U.S. Pat. No. 5,751,848 entitled "System and Method for Generating and Utilizing Histogram Data from a Scanned Image" to Farrell; U.S. Pat. No. 5,835,628 entitled "Method and System for Generating Histograms from a Scanned Image" to Farrell; U.S. Pat. No. 5,848,183 entitled "System and Method for Generating and Utilizing Histogram Data from a Scanned Image" to Farrell; U.S. Pat. No. 5,881,166 entitled "Method and System for Generating A Histogram of a Scanned Image" to Farrell; U.S. patent application Ser. No. 08/886,205 entitled "Method for Determining Document Background for Adjusting the Dynamic Range of an Image of the Document" to Tse, et al; and U.S. patent application Ser. No. 09/159,038 entitled "Adaptive Autobackground Suppression to Compensate for Integrating Cavity Effect" to Nagarajan, et al.

Figure 4:
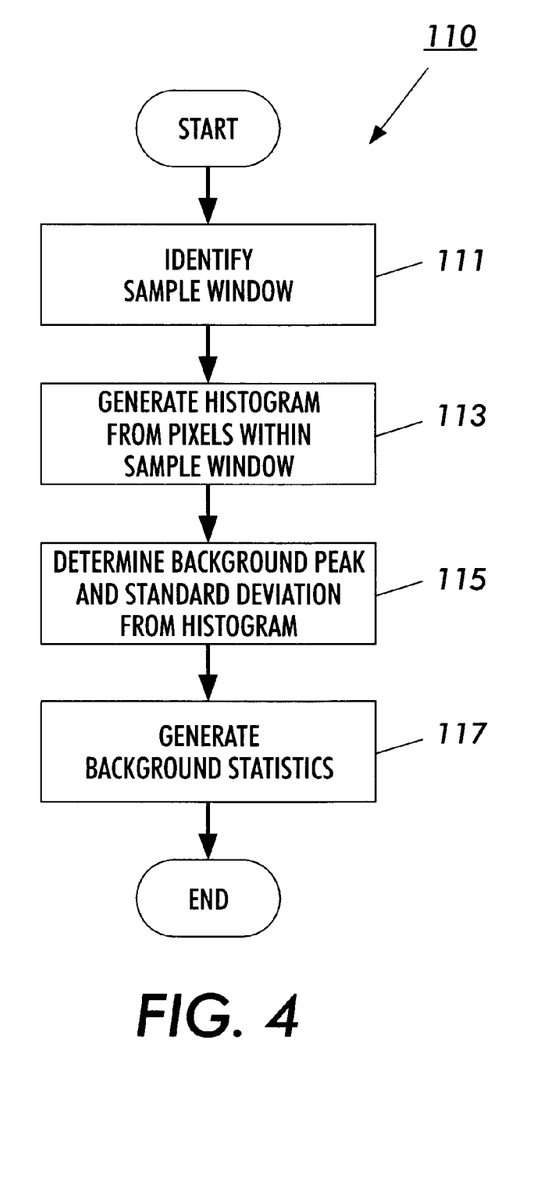
FIG. 4 illustrates a process for generating background statistics for a sub-region of a document area according to the concepts of the present invention.

FIG. 4 shows in more detail the process generating background statistics for a sub-region from the scanned image data carried out in step 110 of FIG. 2. In this process, step 111 sets up to generate a histogram from image values from at least one sub-region (e.g., sample window 12 or 14) within document area 10. More specifically, step 111 may identify the sample window to be sampled as defined by a number of scanlines to be sampled, a number of leading scanlines to be skipped in a slowscan direction before sampling, a number of leading pixels to skip in a fastscan direction before sampling begins, and a number of pixels within a scanline to be sampled. Furthermore, if the number of pixels in the sample window is greater than a capacity of a histogram buffer; step 111 identifies selected pixels or creates subsample windows within the sample window to be processed in step 113. More information on identifying sampling windows and generating histograms therefor can be found in U.S. Pat. Nos. 5,751,848, 5,835,628, 5,848,183, and 5,881,166.

In step 113 histogram data is collected from pixels within the scanned image data from the identified sample window. Step 115 determines the sample window histogram peak $P_s$ and the standard deviation $S_s$ from the histogram data collected at step 113. Step 117 can be included to generate further background statistics such as the gain factor and background gray level based on $P_s$ and $S_s$.

Figure 5:
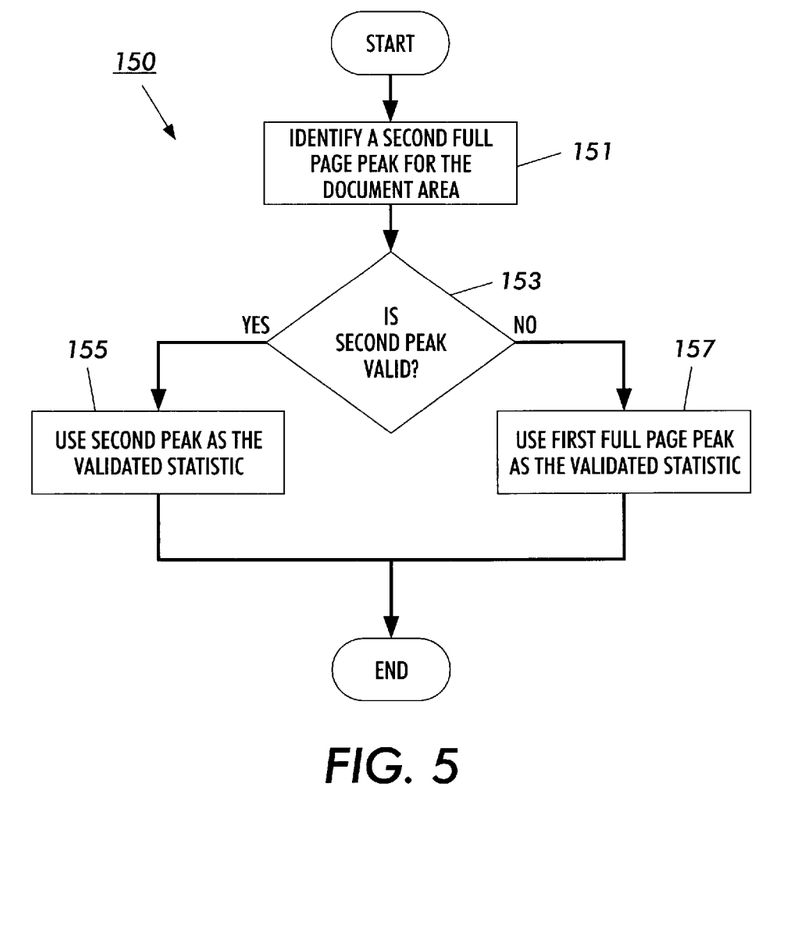
FIG. 5 is a flowchart illustrating a process for generating validated full page background statistics according to the concepts of the present invention.

FIG. 5 is a flowchart illustrating, in more detail, the generation of validated full page background statistics carried out in step 150 of FIG. 2. In this process, step 151 determines new full page background statistics (e.g., peak P'$_f$) from the full page histogram data collected in step 100 by looking past the first page peak. That is, step 151 identifies peak P'$_f$ in a manner similar to that as described above, but begins looking with a bin having a gray level value that is associated with a lower intensity (blacker) than that of peak P$_f$. Having identified a new page peak P'$_f$, step 151 can identify the standard deviation and generate any additional background statistics that may be needed.

At step 153, the new full page background statistics (e.g., peak P'$_f$) are compared with one or more thresholds to determine if the new statistics are valid. In particular, the thresholds are chosen to ensure that the new background peak P'$_f$ is more likely associated with document background than the platen cover or the document image. If a new background statistic is within the threshold(s), the new statistics are deemed to be valid statistics and the process continues with step 155 wherein the new background statistics (e.g., peak P'$_f$) are used for further background detection processing. Alternatively, if in step 153 a new background statistic is found to be outside of the threshold range, the process establishes that new valid statistics were not generated and continues with step 157. At step 157, the process reverts back to the full page statistics collected in step 100 as the validated statistics used for further background detection processing.

In a preferred embodiment, the thresholds used in step 153 are based on background statistics generated from the full page histogram data as well as histogram data collected from one or more sub-regions including sample window 16. In this embodiment, step 110 would need to generate a background statistics for two sub-regions (e.g., sample window 16 as well as sample window 12 or 14).

More particularly, with the above embodiment, step 110 would be modified to identify a first sample window (e.g., window 12) for one sub-region of the document area and a second sample window (e.g., window 16) for a second sub-region. The first and second sample windows each can be defined by a number of scanlines to be sampled, a number of leading scanlines to be skipped in a slowscan direction before sampling, a number of leading pixels to skip in a fastscan direction before sampling begins, and a number of pixels within a scanline to be sampled. Furthermore, the modified step 110 would generate a first histogram from pixels within the first sample window and a second histogram from pixels within the second sample window.

The following is a detailed example of the process for identifying the background value of a scanned image that separates gray levels of non-document areas from those of the document according to an embodiment of the present invention as shown in FIGS. 2–5. The background statistics used in discussing this detailed example are the histogram of pixel intensity values, the background peak determined form the histogram and the standard deviation of the peak value.

In this example, histogram data is collected from selected pixels within document area 10, within a sub-region near the right edge (sample window 12) and within a sub-region at the document center (sample window 16) and a histogram of the image values is generated for each of the three regions. Having compiled the histograms, the process then determines background peak value and the standard deviation for each histogram. That is, step 100 determines the full page background peak value P$_f$ and the standard deviation S$_f$ from the histogram compiled from document area 10, while the right edge background peak value P$_r$ and standard deviation S$_r$ from the histogram compiled from window 12 and the center background peak value P$_c$ and standard deviation S$_c$ from the histogram compiled from window 16 are generated in step 110.

Having determined the peak values, step 120 determines if the platen cover is detected in the right edge histogram compiled for sample window 12. That is, step 120 determines if the background statistics generated for window 12 correspond to image data from a non-document area such as the platen cover. Beneficially, this determination is realized by ascertaining if the right edge histogram corresponds to a histogram for the platen cover. Specifically, the right edge peak value P$_r$ is compared to the range defined by the highest and lowest gray level values expected for the platen cover, and the standard deviation S$_r$ is compared to the maximum standard deviation for the average gray level of the platen cover. Mathematically these comparisons are given by:

$$PC_{low} < P_r < PC_{high} \qquad (1)$$

$$S_r < Max\_Std\_Dev \qquad (2)$$

wherein PC$_{low}$ is the lowest gray level value for the platen cover, PC$_{high}$ is the highest gray level value for the platen cover and Max$_{13}$ Std_Dev is the maximum standard deviation of the average gray level of the platen cover. The values for PC$_{low}$, PC$_{high}$ and Max_Std_Dev can be determined through calibration techniques. In one system with a white platen cover PC$_{low}$ was found to be 210; PC$_{high}$ was found to be 230; and Max_Std_Dev was found to be 2.5.

If either one of the conditions given by equations (1) and (2) is not met, the process determines that the platen cover is not detected in the right edge histogram. That is, because the right edge peak P$_r$ is not within the range of gray level values for the platen cover and/or the standard deviation S$_r$ is greater than that which would be expected to be seen if the peak were due to the platen cover, the process establishes that the platen cover was not detected within window 12. As discussed above, if the cover is not detected in the window, the process continues with the determination of the overall gain for the scanned image using the full page peak P$_f$ (step 130). However, if both of the conditions given by equations (1) and (2) are met (that is, the right edge peak P$_r$ is within the range of gray level values for the platen cover and the standard deviation S$_r$ is similar to that of the platen cover) the process judges that the platen cover was seen in window 12.

As discussed above, when the platen cover is detected within a sub-region, the process determines if the full page peak value may have been corrupted by the platen cover. To accomplish this, the process beneficially compares the full page background peak value P$_f$ with the right edge peak. Specifically, the process determines if the full page peak value falls within the background peak identified from the histogram compiled from window 12. This comparison can be expressed as:

$$(P_r - MS_r) < P_f < (P_r + MS_r) \qquad (3)$$

wherein M is a constant greater than 0 and preferably 2.

That is, if the full page peak P$_f$ falls within two sigma of the right edge peak, the process judges that the full page histogram may have been corrupted by the platen cover and, as a result, the full page peak P$_f$ may have been miscalculated. On the other hand, if the full page peak P$_f$ is not within two sigma of the right edge peak, the process considers full page histogram and the full page peak P$_f$ to be unaffected by the platen cover and uses the full page histogram and peak P$_f$ to determine the overall gain (step 130).

If the process judges that the full page statistics may be corrupted by the platen cover, the full page histogram is analyzed to generate a validated full page background peak. As described above, the generation of a validated full page background peak begins with the identification of new full page peak P'$_f$ from the full page histogram data collected in step 100 by looking past the first page peak. That is, the new peak P'$_f$ comprises a peak from a bin value (gray level value) with lower intensity (blacker) than that of peak P$_f$.

Having identified a new full page peak P'$_f$, the new peak is compared with thresholds based on background statistics generated from histogram data collected from sample window 16 to determine if P'$_f$ is valid. Beneficially, to be valid the new peak P'$_f$ is at least two sigma less than the right edge peak P$_r$ and has a minimum frequency based on that of peak P$_f$. Additionally, to ensure that the new peak is a background peak, the new peak P'$_f$ should be greater than the lowest background peak that could be obtained for the scanned document as determined from the center (window 16) of the document. That is, the validity of the new peak P'$_f$ beneficially is determined using the following conditions:

$$P'_f < (P_r - MS_r) \quad (4)$$

$$(P_c - MS_c) < P'_f \quad (5)$$

$$P'_f(\text{count}) > N\, P_f(\text{count}) \quad (6)$$

wherein P$_f$(count) is frequency of the peak bin (the number of pixels in the peak bin); P'$_f$(count) is frequency of the new peak bin; M is a constant greater than 0 and preferably 2; and N is a constant between 0 and 1.

If each of the conditions given by equations (4), (5) and (6) are met, the process establishes that a new valid background peak has been identified. That is, the new background peak P'$_f$ is deemed to be a valid peak and process continues with the new background peak P'$_f$ as the validated peak used for further background detection processing such as the computation of the overall gain for the scanned document. On the other hand, if one or more of the conditions of equations (4), (5) and (6) are not met, the process establishes that a valid peak could not be identified (i.e., the new peak P'$_f$ is not valid) and reverts back to the full page peak P$_f$ previously collected in step 100 as the validated peak used for computation of the overall gain.

Figure 6:
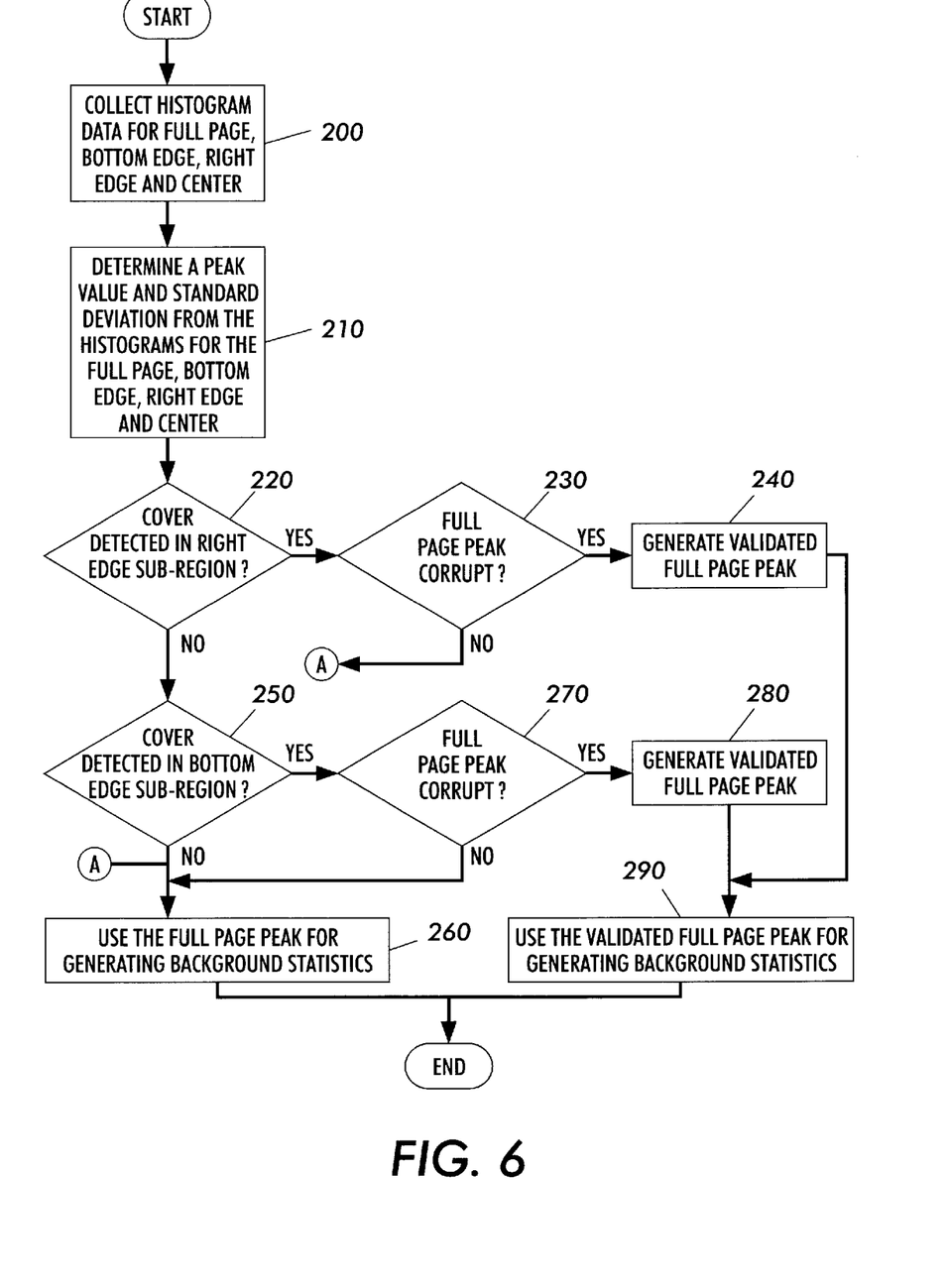
FIG. 6 illustrates a process that uses information collected from two sub-regions in determining if gray level information obtained from non-document areas was included in the determination of background according to the concepts of the present invention.

Turning now to FIG. 6, there is shown a flowchart illustrating a process that uses information collected from two sub-regions to determine if gray level information obtained from a non-document area may have been included in the determination of the background. The process illustrated in FIG. 6, begins at step 200 with the collection of histogram data and the compilation of a histogram from each of a plurality of regions including document area 10, window 12, window 14 and window 16. Having compiled the histograms, the process then determines background peak value and the standard deviation for each histogram at step 210. That is, step 210 determines the full page background peak value P$_f$ and the standard deviation S$_f$ from the histogram compiled from document area 10, the right edge background peak value P$_r$ and standard deviation S$_r$ from the histogram compiled from window 12, the bottom edge peak value P$_b$ and standard deviation S$_b$ from the histogram compiled from window 14 and the center background peak value P$_c$ and standard deviation S$_c$ from the histogram compiled from window 16.

At step 220, the process determines if the platen cover is detected in the right edge histogram compiled for sample window 12. That is, step 120 determines if the background statistics generated for window 12 correspond to image data from a non-document area such as the platen cover. Beneficially, this determination is realized by ascertaining if the right edge histogram corresponds to a histogram for the platen cover. This determination can be made in same manner as discussed above using the relationships given in equations (1) and (2). As discussed above, if either one of the conditions given by equations (1) and (2) is not met, the process determines that the platen cover is not detected in the right edge histogram. If the cover is not detected in window 12, the process determines whether platen cover is detected in the bottom edge histogram at step 250, discussed in detail below. However, if the both of the conditions given by equations (1) and (2) are met, the process establishes that the platen cover was seen in window 12 and continues with step 230 wherein a determination of whether the full page peak value may have been corrupted by the platen cover is made.

The determination of whether the full page peak value may have been corrupted is performed in the same manner as previously discussed above using the relationship given in equation (3). Specifically, the process compares the full page background peak value P$_f$ with the right edge peak to determine if the full page peak P$_f$ falls within two sigma (2 S$_r$) of the right edge peak P$_r$. If not, the full page histogram and the full page peak P$_f$ are considered to be unaffected by the platen cover and the process uses the full page histogram and peak P$_f$ to determine the overall gain (step 260).

Alternatively, if the full page peak does fall within two sigma of the right edge peak, the full page histogram and the full page peak P$_f$ may have been corrupted by image data from non-document areas such as the platen cover. In this case, the process generates a validated full page peak at step 240. Step 240 operates in the same manner as step 150 described above. That is, a new full page peak P'$_f$ is identified from the full page histogram data collected in step 200 by looking past the first page peak. Next, the validity of the new full page peak P'$_f$ is determined in accordance with the conditions given by equations (4), (5) and (6).

If each of the conditions given by equations (4), (5) and (6) are met, the new background peak P'$_f$ is deemed a validated peak and the process continues with the generation of background statistics such as the computation of the overall gain using the new background peak P'$_f$ at step 290. On the other hand, if one or more of the conditions of equations (4), (5) and (6) are not met, the process establishes that the new peak P'$_f$ is not valid and reverts back to the full page histogram and peak P$_f$ generated in steps 200 and 210 as the validated peak used for computation of the overall gain at step 290.

Step 250 determines if the platen cover is detected in the bottom edge histogram compiled for window 14. Beneficially, this determination is realized by ascertaining if the bottom edge histogram corresponds to a histogram for the platen cover. This determination can be made in a manner similar to that used to detect the platen cover in the right edge histogram. Specifically, the bottom edge peak gray level value P$_b$ is compared to the range defined by the highest and lowest gray level values expected for the platen cover, and the standard deviation S$_b$ of the bottom background peak compared to the maximum standard deviation for the average gray level of the platen cover. That is, step 250 determines if the following conditions are met:

$$PC_{low} < P_b < PC_{high} \quad (7)$$

$$S_b < Max\_Std\_Dev \quad (8)$$

If the both of the conditions given by (7) and (8) are met (that is, the bottom edge peak P$_b$ is within the range of gray level values for the platen cover and the standard deviation $S_b$ is similar to that of the platen cover) the process deems that the platen cover was seen in window 14 and continues with step 270. On the other hand, if one of the conditions of equations (7) and (8) are not met, the platen cover was not seen in window 14 and the processing continues with step 260. Step 260 generates background statistics such as the overall gain using the full page histogram and peak $P_f$ generated in steps 200 and 210.

Step 270 determines whether the full page peak value may have been corrupted. This determination is made in a manner similar to that of step 230. However, rather than comparing the full page peak to with the right edge peak, step 270 determines if the full page peak $P_f$ falls within two sigma (2 $S_b$) of the bottom edge peak $P_b$. That is, step 270 determines if the following condition is met:

$$(P_b - MS_b) < P_f < (P_b + MS_b) \quad (9)$$

wherein M is a constant greater than 0 and preferably 2.

If not, the full page histogram and the full page peak $P_f$ are considered to be unaffected by the platen cover and the process uses the full page histogram and peak $P_f$ to determine the overall gain (step 260). If the condition of equation (9) is met, the full page histogram and the full page peak $P_f$ may have been corrupted by image data from the platen cover. In this case, the process generates a validated full page peak at step 280.

Step 280 operates in a manner similar to that of step 240. That is, a new full page peak $P'_f$ is identified from the full page histogram data collected in step 200 by looking past the first page peak. Next, the validity of the new full page peak $P'_f$ is determined in accordance with the conditions:

$$P'_f < (P_b - MS_b) \quad (10)$$

$$(P_c - MS_c) < P'_f \quad (11)$$

$$P'_f(\text{count}) > N\, P_f(\text{count}) \quad (12)$$

wherein M is a constant greater than 0 and preferably 2 and N is a constant between 0 and 1 and beneficially between 0.15 and 0.35.

If each of the conditions given by equations (10), (11) and (12) are met, the new background peak $P'_f$ is deemed a validated peak and the process continues with the generation of background s such as the computation of the overall gain using the new background peak $P'_f$ at step 290. On the other hand, if one or more of the conditions given by equations (10), (11) and (12) are not met, the process deems a valid peak was not identified and reverts back to the full page histogram and peak $P_f$ generated in steps 200 and 210 as the validated peak used for computation of the overall gain at step 290.

In summary, the present invention provides a process for determining the background value of a scanned image that discriminates gray level information obtained from non-document areas from gray level information corresponding to the document's background. The process collects histogram information for predefined area defining the size and shape of a standard full page document as well as one or more sub-regions within the predefined area where gray level data from non-document areas may be collected if the predefined area does not accurately represent the scanned image. The process analyzes the histograms for the sub-regions to determine if a peak value of the histogram lies within the gray level value of the platen cover. If so, the approach compares the peak value of the full page area to determine if it is within a threshold range of the peak value from either sub-region. If the full page peak is within a threshold range, the approach looks beyond the first peak value of the full page area to determine if a second, valid background peak can be found.

Although the present invention has been described in detail above, various modifications can be implemented without imparting from the spirit. For example, the present invention has been described with respect to a black and white system. However, the concepts of the present invention can be extended to a color application wherein the histogram data and processing is carried out in each color space. Moreover, the present invention has been described with respect to a system having 255 gray levels. However, the system can be easily applicable to any number of gray levels.

While the present invention has been described with reference to various embodiments disclosed above, it is not confined to the details to support the above, but is intended to cover such alternatives, modifications, and variations as may come within the scope of the attached claims.

What is claimed is:

1. A method for generating background statistics for a scanned document, comprising the steps of:
   (a) determining a full page background statistic from selected pixels within a document area;
   (b) determining a sub-region background statistic from selected pixels within a sub-region of the document area;
   (c) determining if the sub-region background statistic corresponds to image data from a non-document area;
   (d) determining if the full page background statistic is corrupted; and
   (e) generating a validated full page background statistic if the full page background statistic is corrupted.

2. The method according to claim 1, further comprising the step (f) of generating a background statistic for a scanned document using one of full page background statistic and the validated full page background statistic.

3. The method according to claim 1, wherein the sub-region background statistic comprises a sub-region histogram and wherein step (c) ascertains if the sub-region histogram corresponds to a histogram for the platen cover.

4. The method according to claim 1, wherein the sub-region background statistic comprises a sub-region background peak $P_s$ and wherein step (c) comprises the substeps:
   (c1) comparing the sub-region peak $P_s$ to a range of gray level values for the non-document area; and
   (c2) establishing that the sub-region background statistic corresponds to image data from a non-document area when the sub-region peak $P_s$ is within the range of gray level values for the non-document area.

5. The method according to claim 4, wherein step (c) further comprises:
   (c3) comparing a standard deviation $S_s$ of a sub-region background peak to a standard deviation of a background peak for the non-document area; and
   wherein substep (c2) establishes that the sub-region background statistic corresponds to image data from a non-document area when both the sub-region peak $P_s$ is within the range of gray level values for the non-document area and standard deviation $S_s$ is less than the standard deviation of a background peak for the non-document area.

6. The method according to claim 1, wherein step (d) comprises comparing the full page background statistic with the sub-region background statistic.

7. The method according to claim 6, wherein the full page background statistic comprises a full page peak $P_f$ and the sub-region background statistic comprises a sub-region peak $P_s$ and wherein the comparison of step (d) is given by $(P_s-MS_s)<P_f<(P_s+MS_s)$, wherein $S_s$ is the standard deviation of the sub-region peak $P_s$ and M is a constant greater than 0.

8. The method according to claim 1, wherein step (e) comprises the substeps:

(e1) determining a second full page background statistic from pixels within the document area;

(e2) determining if the second full page background statistic is valid; and (e3) using the second full page background statistic as the validated full page background statistic when the second full page background statistic is valid.

9. The method according to claim 8, further comprising the substep (e4) using the full page background statistic as the validated full page background statistic when the second full page background statistic is not valid.

10. The method according to claim 8, wherein step (e2) comprises comparing the second full page background statistic to at least one of a peak count range, a minimum peak value and a maximum peak value.

11. The method according to claim 10, wherein the peak count range is based on a peak count for the full page background statistic.

12. The method according to claim 10, wherein the minimum peak value is based on a background statistic for a sub-region near the center of the document area.

13. The method according to claim 10, wherein the maximum peak value is based on the sub-region background statistic.

14. The method according to claim 8, wherein substep (e2) comprises determining if at least one of $P'_f<(P_s-MS_s)$, $(P_c-MS_c)<P'_f$, and $P'_f(count)>N\, P_f(count)$ is met, wherein $P_f$ is a background peak for the document area, $P'_f$ is a second background peak for the document area, $P_s$ is a background peak for the sub-region, $P_c$ is a background peak for a second sub-region of the document area, $S_s$ is the standard deviation of the background peak for the sub-region, $S_c$ is the standard deviation of the background peak for the second sub-region, $P'_f(count)$ is the number of pixels in the background peak document area, $P'_f(count)$ is number of pixels in the second background peak for the document area, peak bin), M is a constant greater than 0, and N is a constant between 0 and 1.

15. A method for generating background statistics for a scanned document, comprising the steps of:

(a) generating a full page background statistic from selected pixels within a document area;

(b) generating a first sub-region background statistic from image data within a first sub-region of the document area;

(c) generating a second sub-region background statistic from image data within a second sub-region of the document area;

(d) determining if the first sub-region background statistic corresponds to image data from a non-document area;

(e) if the first sub-region background statistic corresponds to image data from a non-document area, making a determination of whether the full page background statistic is corrupted based on the first sub-region background statistic and, if so, generating a validated full page background statistic;

(f) determining if the second sub-region background statistic corresponds to image data from a non-document area; and (g) if the second sub-region background statistic corresponds to image data from a non-document area, making a determination of whether the full page background statistic is corrupted based on the second sub-region background statistic and, if so, generating a validated full page background statistic.

16. The method according to claim 15, wherein the first sub-region comprises a window near a bottom edge of the document area and the second sub-region comprises a window near the right edge of the document area.

17. The method according to claim 15, wherein the first sub-region background statistic comprises a background peak $P_{s1}$ and wherein step (d) comprises the substeps:

(d1) comparing the sub-region peak $P_{s1}$ to a range of gray level values for the non-document area; and (d2) establishing that the sub-region background statistic corresponds to image data from a non-document area when the sub-region peak $P_{s1}$ is within the range of gray level values for the non-document area.

18. The method according to claim 15, wherein step (e) comprises the substeps:

(e1) determining if the full page full page background statistic is within a range about the first sub-region background statistic; and, if so (e2) generating a second full page full page background statistic from selected pixels within the document area;

(e3) determining if the second full page background statistic is valid; and (e4) using the second full page background statistic as the validated full page background statistic when the second full page background statistic is valid.

19. The method according to claim 18, wherein step (e2) comprises comparing the second full page background statistic to at least one of a peak count range, a minimum peak value and a maximum peak value.

* * * * *